M. REINTANZ & A. ROTHE.
HAND RECEIPT STAMP.
APPLICATION FILED MAR. 31, 1905.

997,850.

Patented July 11, 1911.
7 SHEETS—SHEET 3.

WITNESSES:

INVENTOR
Max Reintanz and Alfred Rothe
BY Brashears
ATTORNEY

M. REINTANZ & A. ROTHE.
HAND RECEIPT STAMP.
APPLICATION FILED MAR. 31, 1905.

997,850.

Patented July 11, 1911.
7 SHEETS—SHEET 5.

WITNESSES
S. Brashears
P. Brashears.

INVENTORS
Max Reintanz & Alfred Rothe
by [signature], Attorney

M. REINTANZ & A. ROTHE.
HAND RECEIPT STAMP.
APPLICATION FILED MAR. 31, 1905.

997,850.

Patented July 11, 1911.
7 SHEETS—SHEET 6.

WITNESSES
S. Brashears
Paul H. Brashears.

INVENTORS
Max Reintanz & Alfred Rothe
by _____, Attorney

M. REINTANZ & A. ROTHE.
HAND RECEIPT STAMP.
APPLICATION FILED MAR. 31, 1905.

997,850.

Patented July 11, 1911.
7 SHEETS—SHEET 7.

WITNESSES
S. Brashears
P. Brashears

INVENTORS
Max Reintanz &
Alfred Rothe
by
Their Attorney

UNITED STATES PATENT OFFICE.

MAX REINTANZ AND ALFRED ROTHE, OF DRESDEN, GERMANY; SAID REINTANZ ASSIGNOR TO THE NATIONAL CASH REGISTER COMPANY, A CORPORATION OF OHIO.

HAND RECEIPT-STAMP.

997,850.    Specification of Letters Patent.    Patented July 11, 1911.

Application filed March 31, 1905. Serial No. 253,173.

*To all whom it may concern:*

Be it known that we, MAX REINTANZ and ALFRED ROTHE, both subjects of the German Emperor, and residing at Dresden, Germany, have invented certain new and useful Improvements in Hand Receipt-Stamps, of which the following is a specification.

The present invention relates to a hand stamp for receipting purposes, and having a counting mechanism which automatically sums up all the various amounts receipted, during the stamping operation. For this purpose the shaft of the number adjustment disks also carries counting mechanism, which is set simultaneously with adjustment of the figure to be stamped. On pressing the handle to print the figure which has been set, the stamp slides in the frame and thereby actuates the counting mechanism in the required manner.

It is desirable that the figure to be set by the adjustment disks be presented in a straight line to the eye, so that no error of adjustment may occur. For this reason the adjustment disk is caused to actuate a display drum in addition to the type wheel. The case has corresponding perforations through which the numbers of the drum can be seen and a check thus kept on the adjustment.

The stamp is of extremely compact construction and can be used not only for stamping paper slips of all sizes, but also books and the like.

With these and incidental objects in view the invention consists in certain novel features of construction and combinations of parts, the essential elements of which are set forth in appended claims and a preferred form of embodiment of which is hereinafter described with reference to the drawings which accompany and form part of the specification.

Figure 1:
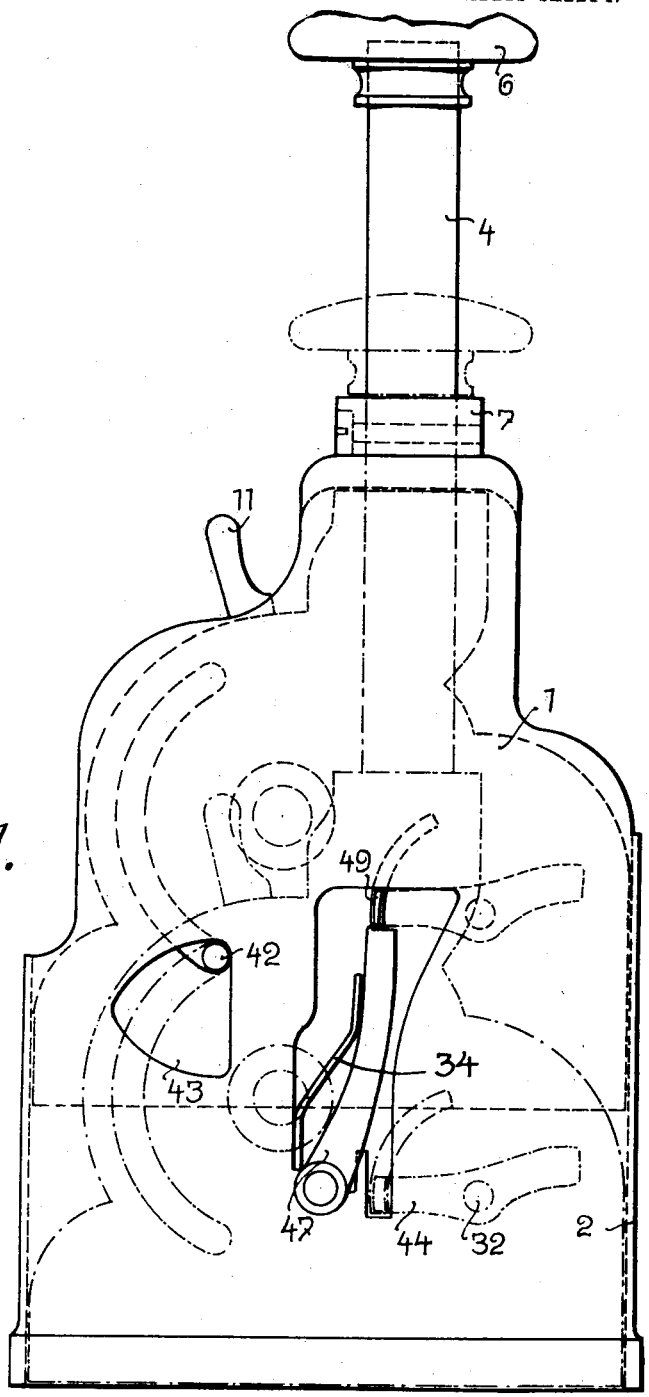
Figure 2:
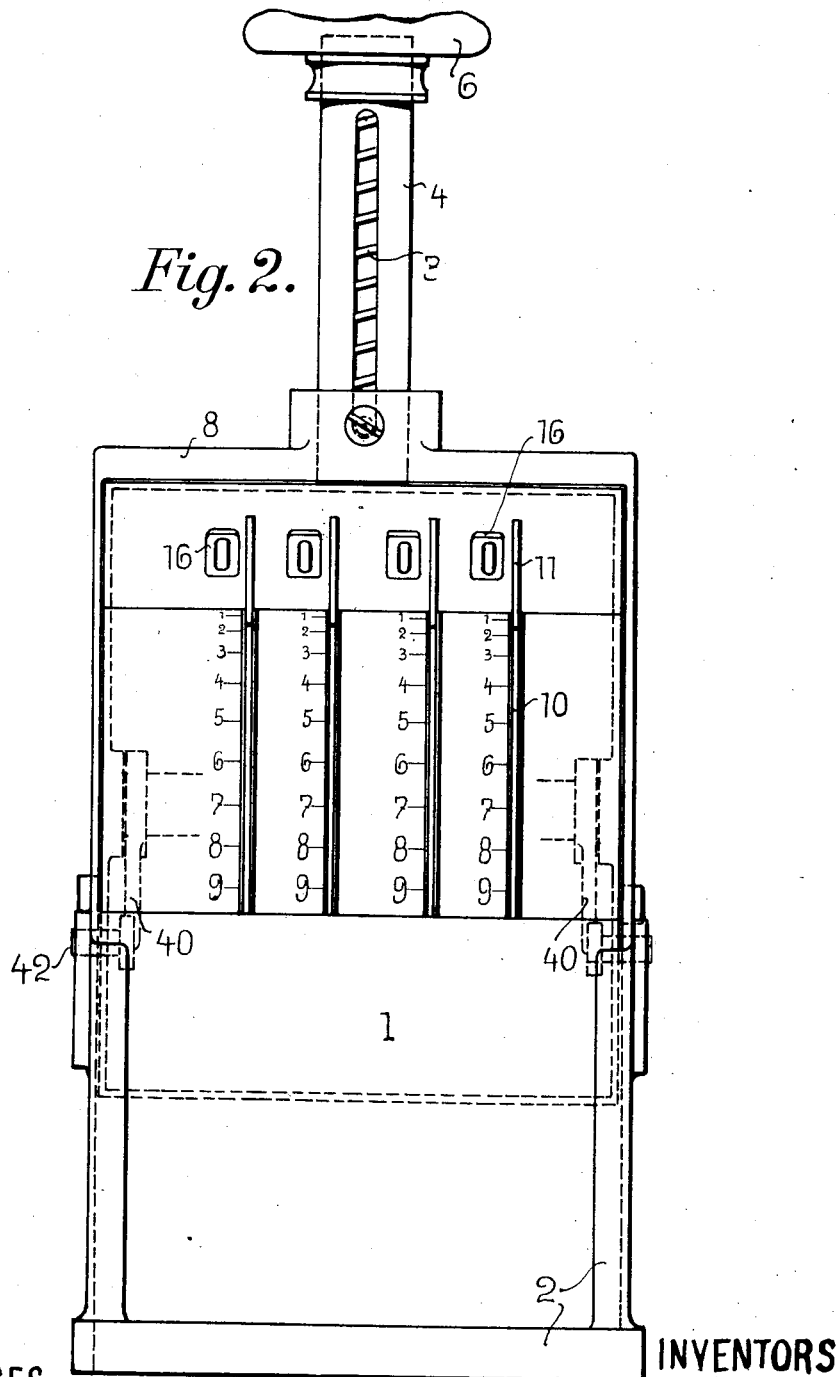
Figure 3:
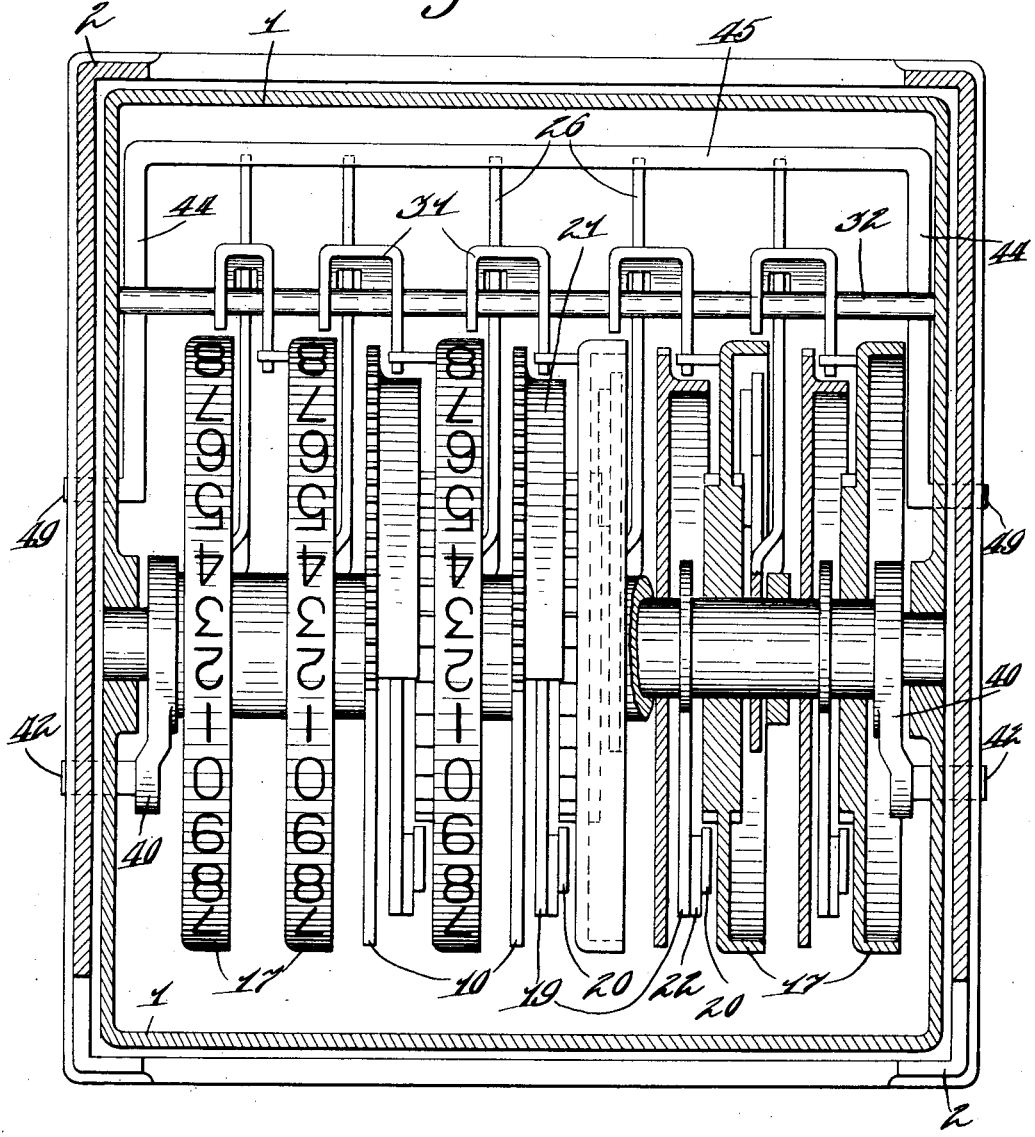
Figure 4:
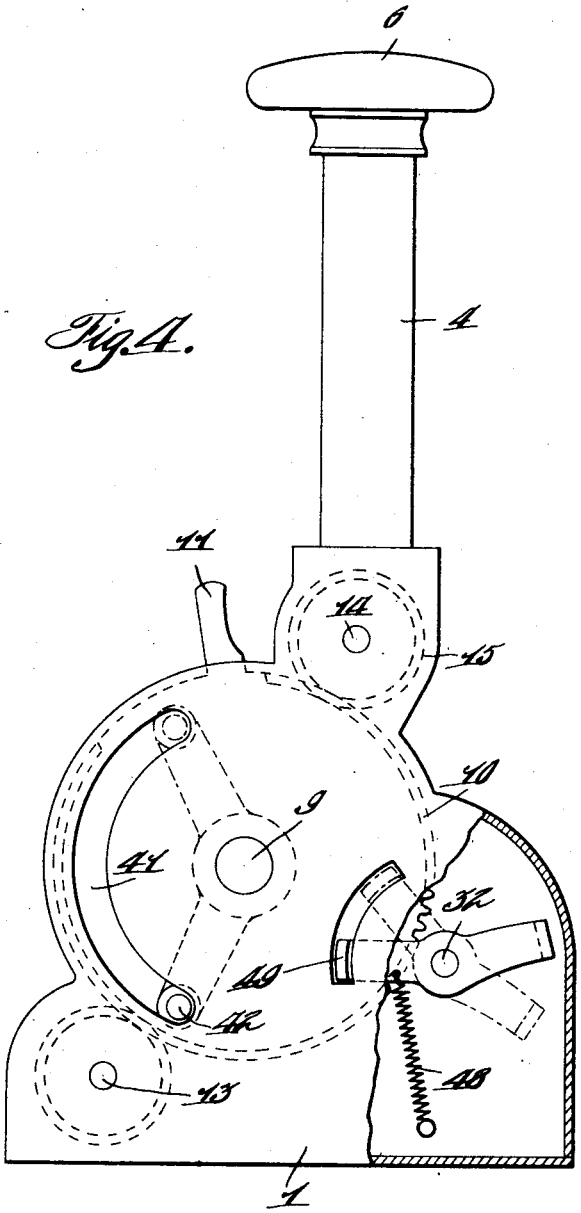
Figure 5:
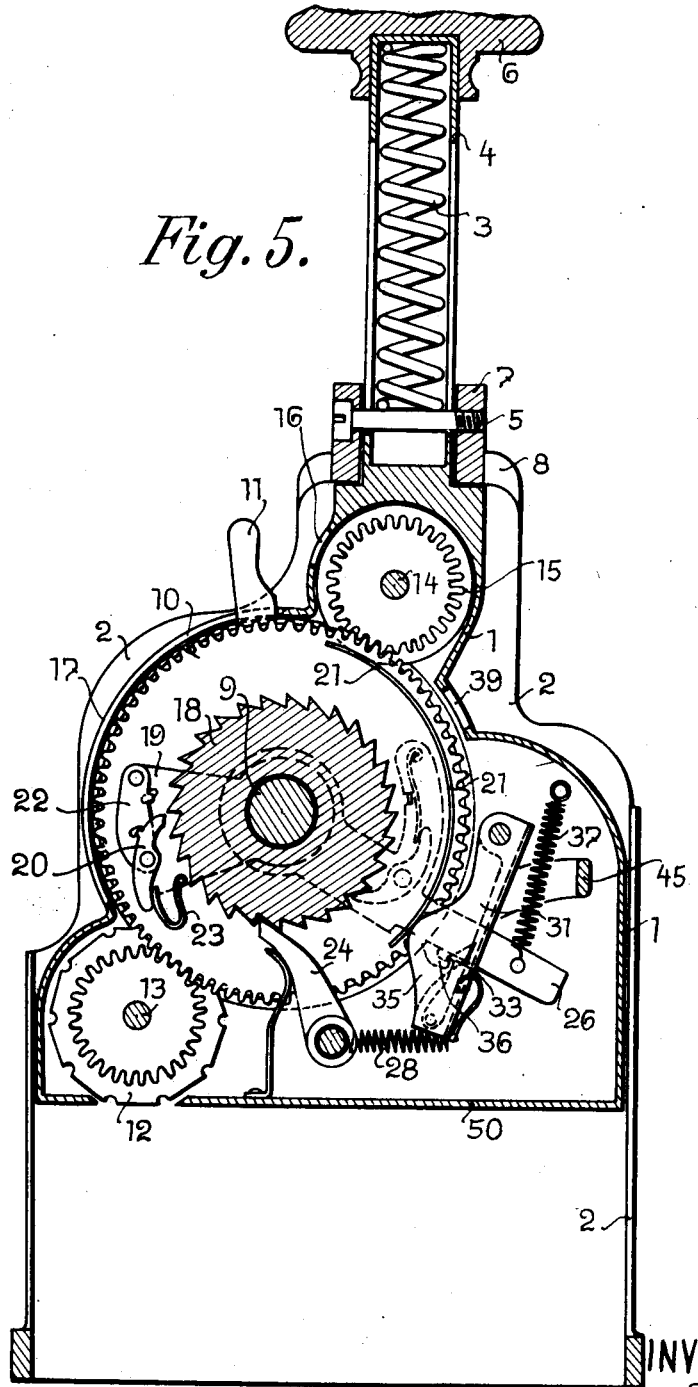
Figure 6:
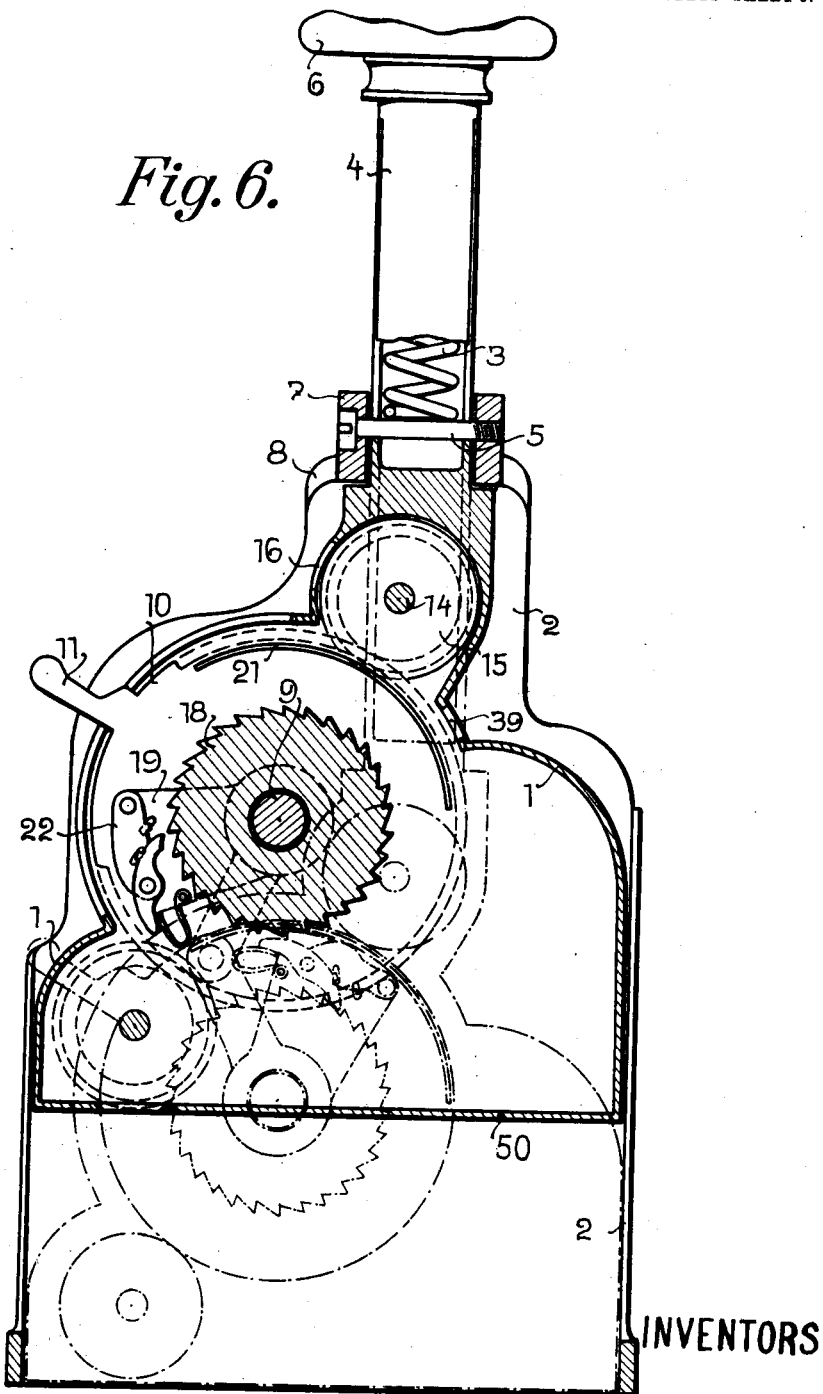
Figure 7:
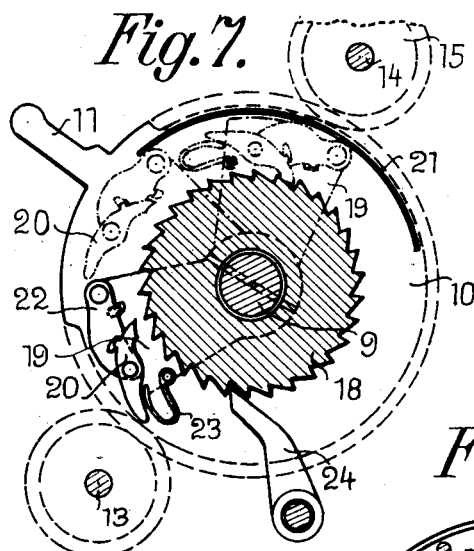
Figure 8:
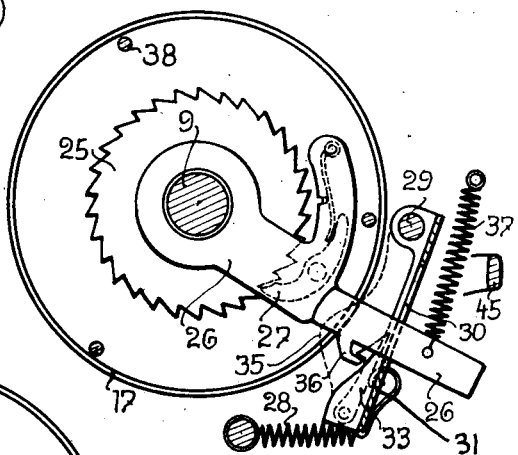
Figure 9:
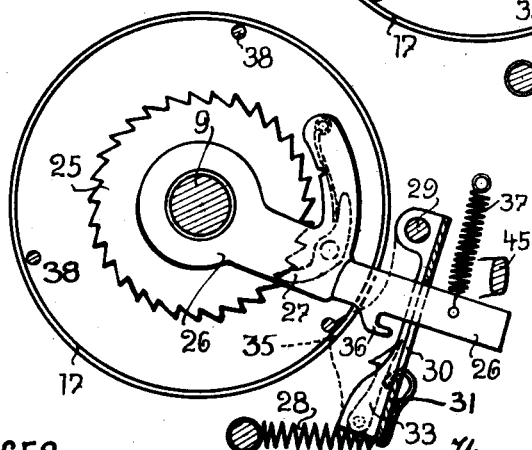

Figure 1 is a side elevation of the stamp showing in broken lines the position assumed by certain of its parts upon a depression of the operating handle. Fig. 2 is a front elevation of the stamp. Fig. 3 is a view in cross section of the stamp taken on and looking downward from the line 3—3 of Fig. 2, and showing the recording mechanism, portions of which are broken away for the sake of clearness. Fig. 4 is a side elevation of a portion of the casing showing in dotted and broken lines the normal and operated positions respectively of certain of the parts, a portion of the casing being broken away for the sake of clearness. Fig. 5 is a section on the line 5—5 of Fig. 2. Fig. 6 is a diagrammatic sectional view taken on the same line as Fig. 5 and showing in dotted lines the position assumed by certain of the parts, shown in full in Fig. 5, when the stamp is in operated condition. Fig. 7 is a detail view showing in broken lines the movements of the operating pawls with relation to the adding mechanism. Fig. 8 is a detail view showing the transfer or tens carrying lever in locked position. Fig. 9 is a view similar to Fig. 8, but showing the tens carrying lever released.

The case 1 containing the adjusting and counting mechanisms, slides vertically within the frame 2. The case is held in the elevated position in well known manner by means of a spring 3, located in a tubular extension 4 of the case. One end of this spring 3 bears on the pin 5 of the case, while the other end presses against the top of the tube 4, which may be provided with a knob or handle 6. On stamping, the force of the spring 3 has thus to be overcome. The tube 4 receives guidance from the boss 7 of the cross-bar 8 of the frame.

The operating mechanism of the stamp consists of adjustment disks and groups of detent carrying arms, all mounted on a shaft 9 turning in the walls of the case. For adjusting each number for printing a given number, a toothed disk 10 is loosely mounted on the shaft 9. This disk is rotated by a finger-piece 11 projecting through a slot in the case. The disk meshes below with the type wheel 12 loosely mounted on the shaft 13, and above with the number display drum 15 mounted loose on the shaft 14. The slot for the finger piece 11 of the disk 10 is provided with a scale of figures. When it is desired to print with a certain figure on the wheel, the finger piece 11 must be set to the corresponding figure on the scale. This actuation will cause adjustment of the corresponding figure of the type wheel into the position for printing and at the same time adjustment of the like figure of the display drum before the slot 16, showing at once what figure is about to be printed.

The stamp illustrated has four sets of figures; thus at the holes 16 a straight line of, at the most, four figures can be read off, giving the exact number adjusted for printing below after actuation of the four disks 10. The provision of the drums 15 is not absolutely necessary, since the figures adjusted below can be read off by means of the position of the finger pieces 11. This latter method, however, is inconvenient, since the finger pieces naturally do not appear in alinement, except in very rare instances, as do the slots 16.

The counting mechanism consists of a series of denominational elements shown as wheels or drums 17, loosely mounted on shafts 9, and each being marked with three sets of the digits, from zero to nine. It will be readily understood that more or less sets of digits may be employed. As the drums are all alike in construction a description of one will be sufficient. At one side of the drum 17 a ratchet wheel 18 is secured. 20 is an operating pawl carried by an arm 19 pivoted on a plate 22, which is mounted fast on the shaft 9. This operating pawl can engage with the ratchet wheel 18; every time a stamping operation is performed, this operating pawl skips over ten teeth of the wheel 18, being actuated by a device to be hereinafter described. The operating pawl can be brought into engagement with the ratchet teeth by means of a circularly bent ledge 21 projecting from the side of the adjustment disk and in the normal inactive position located opposite the operating pawl 20.

On a number disk being adjusted, this ledge causes the operating pawl to turn the wheel 18 through as many teeth as are indicated by the number in question. This is effected by the spring actuated operating pawl 20 secured to the plate 22, pivoted to the arm 19. On a number being set (whereby naturally the ledge 21 is correspondingly rotated, see Fig. 6) the plate 22, owing to the movement of the arm 19, due to the printing operation, will strike the ledge 21, whereby its operating pawl 20 will be caused to approach the wheel 18, and engage with the teeth of the latter and so cause the wheel 18 (which is loosely mounted on the shaft 9) to partake of the further motion of the arm 19. During this motion, until the operating pawl reaches its end position, the plate 22 will slide on the inside wall of the ledge 21.

The operating pawl on returning to its initial position after reaching the end of its travel, under the influence of the spring 23 passes back over the teeth just traveled, the number of which corresponds to the number set. The operating pawl is only actually released from engagement with the teeth of the wheel 18, when it leaves the ledge 21. In order that the wheel 18 may not be again actuated during the return travel of the operating pawl, a detent pawl 24 is provided, which pawl is in constant engagement with the ratchet teeth of wheel 18.

Fig. 7 illustrates diagrammatically the operation of the operating pawl 20. The full lines show the said pawl in its initial position, while the dotted lines show the positions assumed in the movement when the plate 22 strikes the ledge 21 and when the pawl 20 is about to be caused by the ledge 21 to bear against the ratchet wheel teeth. The double-dotted lines show the end position of the pawl and the manner in which the latter is held in engagement with the ratchet teeth.

The shaft 9 is rotated by the downward movement of the stamp, as indicated in Fig. 6 and in a manner hereinafter described.

In addition to the wheel 18, a second ratchet wheel 25 is furnished at the opposite side of the drum 17. An actuating mechanism is adapted to engage and actuate this wheel 25 but it only actuates the latter tooth by tooth. The office of this actuating mechanism (which is loosely mounted on shaft 9) is to carry the tens. It consists of an arm 26 and a spring actuated pawl 27 pivoted thereon. The arm 26 has an extension which works in a device suspended from the shaft 29 and held by a spring 28 against the adding drum. This device consists of a U-shaped bracket 31, slotted at 30, and having pivoted to one limb a spring actuated detent or click 33, while the other limb is formed with an elevation 35. The click 33 engages with a catch 36 on the extension of arm 26 and thus holds the arm 26 down, against the action of the spring 37. The elevation 35 serves to force the bracket 31 out of its position of rest by contacting with the studs 38 disposed near the periphery of the drum 17. In the stamp illustrated there are three such studs 38, since there are three groups of digits 0–9 on the drum, and the pawl 27, which is destined to carry the tens to the next drum, must naturally be actuated after a naught has been reached.

The method of operation of the tens carrying mechanism will be understood from Figs. 8 and 9, in which those elements which do not partake in the movements in question are omitted for the sake of clearness. The pins 38, as already remarked, are located on the drum 17 preceding the one shown in Fig. 8, and coöperate with the elevation 35. When the said drum 17 has been rotated by the detent 20 so far that a pin 38 meets the elevation 35 (which is actually the case each time the drum rotates through the distance of ten numbers) the bracket 31 will be forced back against the action of the spring 28, so that the click 33 will release the catch 36 and the arm 26 be drawn up by the spring 37 into the position shown in Fig. 9. At the same time the pawl 27 will snap over one of the teeth of the wheel 25. After passing the elevation 35, the bracket 31 will again be drawn into the position of rest by the spring 28, so that the click 33, on return of the arm 26, will engage with the catch 36, owing to the action of mechanism to be hereinafter described. The arm 26 will then be held until the next pin 38 meets the elevation 35, and so on. In this manner the one drum will always advance the next one through the space of one number, when rotation of such following drum is rendered necessary, such as is the case when ten units are to be added to the sum.

From the description of the counting mechanism it will be understood that each of the adding drums is provided with a ratchet wheel on both sides, the one of these wheels being actuated by a pawl having a circular motion, which is pressed against the adjusting disk by a ledge, while the other wheel is operated by a pawl, actuated or disengaged, by the preceding adding drum; so that the number adjusting disk advances the drum through as many units as the adjusted number indicates, and also whereupon the drum is advanced one step farther, when this is rendered necessary by the ten being reached on the preceding drum. In other words, the adding drum is actuated from both sides in the same direction, the mechanism on the one side advancing it through as many places as the adjusted figure indicates, and the mechanism on the other side advancing it each time through the distance of one step (tens carrying operation). The result of the addition can be seen at any time through apertures 39 provided in the case 1, so that the figures of the adding drums are displayed.

The adding mechanism is operated in the following manner by the rotation of the shaft 9, and by depression of those arms 26 which have been released. On the shaft 9 a crank 40 is secured at both ends, (Fig. 4) having a pin 42 at its outer end projecting through a curved slot 41 in the casing. This pin is adapted to slide in a guide slot 43 in the wall of the frame 2, whereby it is actuated upon a depression of the stamp in printing. This motion is transmitted by the crank 40 to the shaft 9 and thus also to the arms 19 which are in rigid connection with the said shaft. The motion produced by depression of the stamp, that is to say, by printing of the figure which has been set, is a reciprocatory one, since on rise of the stamp after the impression, the crank 40 is again returned to its initial position, so that the motion of the pawls 20 is likewise a uniform reciprocating one over ten teeth of the wheel 18.

In order to depress the elevated arm 26 again for the tens carrying operation, double-armed levers 44 are journaled at each side of the case (Fig. 3) and connected at one end by a rod 45, while the other ends are bent outward at a right angle so as to project through a slot 46 in the case. In the frame 2 there is pivoted a spring actuated detent 47, the upper edge of which butts against the bent lever end 49. If, therefore, the stamp is depressed, as shown in Fig. 1, the detent 47 will hold back the said lever end 49, only the fulcrum portion 32 partaking of the downward motion. In this manner the lever end 49 will be moved upward against the action of the spring 48, and the other lever end with the rod 45 moved downward, until the curved slot has caused the lever end 49 to leave the path of the detent 47. In this position those arms 26 which were previously elevated, are depressed, so that the catches 33 engage with the hooks 36. Thus when the end 49 now leaves the detent 47, owing to the action of the spring 48, the lever 44 and rod 45 will be drawn into their position of rest, while the detent arm will be held down in its lowest position by the device already described. On the ascent of the stamp, the lever end 49 presses the pawl 47 aside, and the latter will only again come below the said end 49, ready for the next stamping operation, under the action of the spring 34 (Fig. 1) on the stamp attaining its top position. The principle of operation of the stamp is therefore as follows: The counting mechanisms consists of a series of accounting elements or drums 17. Reciprocatory operating mechanism for the accounting elements is provided, said operating mechanism being constructed to be given an invariable movement at each sliding movement of the stamp inclosing casing. The reciprocatory operating mechanism consists of the oscillating shaft 9, the arms 19 rigidly mounted on the shaft 9 and the operating pawls 20 carried on the arms. The pawls 20 are normally out of position to engage and actuate their respective accounting elements but a coöperative relation between said pawls and their respective accounting elements may be established at a predetermined point in the invariable movement of the reciprocatory operating mechanism. The time of establishment of such coöperative relation is predetermined by the differential adjustment of the manipulative amount determining elements or finger pieces 11 to set up the amount to be registered and stamped and is effected through the medium of the flange 21 in a manner hereinbefore described. This coöperative relation is maintained during the remaining portion of the invariable movement of the reciprocatory operating mechanism thus actuating the accounting elements to an extent commensurate with the adjustment of the manipulative amount determining elements.

The operation of the stamp is as follows:—The figures required are set by rotating the adjustment disks 10 by means of the finger pieces 11 which move over the graduations on the case, as described. The adjustment can be checked by a glance at the apertures 16. Any error can be at once corrected, since the rotation of the disks 10 merely actuates the type wheels and number display drums.

To print, it is only necessary to depress the knob 6, whereby the spring 3 will collapse and the case descend, as shown in Fig. 1. During this descent those tens carrying levers which may be released will be depressed by the pawl 47; thereupon the pin 42 will travel along the guide slot 43, whereby the said pin will be kept back, while the shaft 9 partakes of the downward motion of the case. The pin 42 during this procedure will follow a curved path as shown in Fig. 1. At the same time the pawl 20 will be actuated and pressed by the ledges 21 against the ratchet wheel 18 at an earlier or later moment (depending upon which figures have been set), so that the said wheel will be likewise operated. When now, on rotation of the drum 17, one of the pins 38 contacts with the elevation on the bracket 31, which holds the tens carrying lever (that is to say, holds the pawl 27 which acts on the succeeding drum) locked, the bracket 31 will be forced back. The arm 26 will thus be released and raised by the spring 37, whereby the pawl will be moved back through the space of one tooth of the wheel 25. On the case 1 rising in the frame after printing, through the action of the spring 3, the cranks will be moved back into their initial position, the pawl 20 snapping back over the ratchet teeth it has just advanced, while the end 49 of lever 44 will force the pawl 47 out of its position of rest, so that it cannot act on the lever 44. The latter, and thus the rod 45 will therefore maintain their position.

Naturally the same figures can be again printed, if desired; or other figures adjusted in like manner. In any case the sum of any given number of printed amounts can always be read at the apertures 39.

What we claim as new is:

1. In a hand receipt stamp, a frame, a casing mounted therein, a shaft arranged in said casing, setting disks and counting drums arranged on said shaft, printing means operably connected with said setting disks, and means connected with the frame for actuating the counting drums upon reciprocation of the casing in the frame.

2. In a hand receipt stamp, a shaft, setting disks, counting drums, and ratchet mechanism on the shaft, a type wheel operated by the setting disks, a ledge on each of the setting disks for moving the ratchet mechanism against the counting drums to actuate the same.

3. In a hand receipt stamp, a shaft, setting disks, counting drums and ratchet mechanisms on the shaft, type wheels geared with the setting disks, a projection on each of said disks and drums, and means whereby said drums are rotated by the engagement of the projections with the said ratchet mechanism.

4. In a hand receipt stamp, a frame, a casing slidably mounted therein, a shaft transversely arranged in said casing, setting disks loosely mounted upon said shaft, counting drums loosely mounted upon said shaft, printing means operatively connected with said setting disks, and operative connections carried by the casing for actuating said counting drums upon the reciprocation of said casing in said frame.

5. In a hand receipt stamp, a frame, a casing slidable therein, type setting disks within said casing, counting drums, and elements carried by said casing and controlled by said disks in the movement of the casing for operating said counting drums.

6. In a hand receipt stamp, a frame, a casing slidably mounted therein, printing means, setting means therefor, counting means, and operative connections carried by said casing and controlled by said setting means during the movement of the casing for operating said counting means.

7. In a hand receipt stamp, a frame, a casing slidable therein, counting mechanism mounted in the casing, and connecting mechanism operated by the reciprocation of the casing in the frame for actuating the counting mechanism.

8. In a hand receipt stamp, a frame, a casing mounted slidably therein, three shafts mounted in the casing, counting means, comprising setting disks mounted loosely on one of said shafts, numeral display drums and printing wheels mounted respectively on the other two shafts and geared to the setting disks, and means operated by the reciprocation of the casing for actuating the counting means.

9. In a hand receipt stamp, a frame, a casing slidably mounted therein, printing means and counting mechanism including carrying devices carried by the casing, and mechanism connecting the counting mechanism with the frame and thereby causing the counting mechanism to be actuated during the reciprocation of the casing in the frame.

10. In a hand receipt stamp, a frame, a casing slidably mounted therein, setting disks, display drums and printing wheels carried by the casing and connected together for simultaneous operation, counting mechanism and carrying devices therefor also carried by the casing and connections for operating the counting mechanism and transfer devices upon the reciprocation of the casing.

11. In a hand receipt stamp, a frame, a casing slidable therein, a shaft mounted in the casing, counting mechanism comprising a plurality of drums loosely mounted on the shaft, a ratchet wheel secured to each side of each drum, an actuating device for each of the ratchet wheels for the purpose of adding and of transferring, and connections which cause the actuation of said devices to operate the counting mechanism when the casing is reciprocated in the frame.

12. In a machine of the class described the combination with a main frame, of a casing slidably mounted therein; a manipulative device and an accounting element mounted in said casing; a reciprocatory operating mechanism for the accounting mechanism, but normally disconnected therefrom, also mounted in said casing and constructed to be given an invariable movement upon each sliding movement of the casing, and means under control of the manipulative device for establishing and maintaining a coöperative relation between said operating mechanism and accounting element during a portion of its reciprocations commensurate with the adjustment of the manipulative device.

13. In a machine of the class described, the combination with a movable casing, of a plurality of accounting elements and actuators therefor carried by said casing, and means for operating the actuators for the accounting elements by movement of the casing.

14. In a machine of the class described, the combination with a movable casing, of a plurality of accounting elements and actuators therefor carried by said casing, means also carried by the casing for determining the extent of movement to be imparted to the accounting elements by the actuators and connections for operating said actuators by the movement of said casing.

15. In a machine of the class described, the combination with a movable casing, of a plurality of accounting elements and actuators therefor carried by said casing, differentially adjustable devices also carried by the casing for determining the extent of movement to be imparted to the accounting elements by the actuators, and connections for operating said actuators by movement of said casing.

16. In a machine of the class described, the combination with a movable casing, of a plurality of accounting elements and actuators therefor carried by the casing, differentially adjustable devices also carried by the casing for determining the extent of movement to be imparted to the accounting elements by the actuators, connections for operating said actuators by movement of the casing, and type carriers positioned by the adjustable devices for recording the amount entered upon the accounting elements.

17. In a machine of the class described, the combination with a movable casing, of a plurality of accounting elements and actuators therefor carried by said casing, transferring devices for the accounting elements also carried by the casing, and means for operating the actuators and the transferring devices upon the movement of the casing.

18. In a machine of the class described, the combination with a movable casing, of a plurality of accounting elements and actuators therefor carried by said casing, transferring devices for the accounting elements also carried by the casing, differentially adjustable devices mounted in the casing for determining the extent of movement to be imparted to the accounting elements by the actuators, type carriers positioned by the adjustable devices for recording the amount entered upon the accounting elements, and means for operating the actuators and the transferring devices upon the movement of the casing.

19. In a machine of the class described, the combination with a main frame, of a casing slidably mounted therein, a shaft carried by said casing, accounting elements and actuators therefor mounted upon said shaft, and means for operating the accounting elements by the actuators during the sliding movement of the casing.

20. In a machine of the class described, the combination with a main frame, of a casing slidably mounted therein, a shaft carried by said casing, accounting elements and actuators and transferring devices therefor mounted upon said shaft, differentially adjustable devices also carried by the casing for determining the extent of movement to be imparted to the accounting elements by the actuators, and means for operating the actuators and transferring devices during the sliding movement of the casing.

In testimony whereof we affix our signatures in presence of two witnesses.
    MAX REINTANZ.
    ALFRED ROTHE.

Witnesses:
 FR. H. LEHNERT,
 CHEMNITZ H. SCHILLING.

---

Copies of this patent may be obtained for five cents each, by addressing the "Commissioner of Patents, Washington, D. C."